Sept. 8, 1953  J. M. BRADY ET AL  2,651,459
VELOCITY AND DIRECTION COMPUTER
Filed Jan. 31, 1951  2 Sheets-Sheet 1

INVENTORS
JAMES M. BRADY
ATHELSTAN F. SPILHAUS
BY
Harry M. Saragovitz
Attorney

Sept. 8, 1953    J. M. BRADY ET AL    2,651,459
VELOCITY AND DIRECTION COMPUTER

Filed Jan. 31, 1951    2 Sheets-Sheet 2

INVENTORS
JAMES M. BRADY
ATHELSTAN F. SPILHAUS
BY
Harry M. Saragovitz
Attorney

Patented Sept. 8, 1953

2,651,459

UNITED STATES PATENT OFFICE 2,651,459

VELOCITY AND DIRECTION COMPUTER

James M. Brady, West Long Branch, N. J., and Athelstan F. Spilhaus, St. Paul, Minn., assignors to the United States of America as represented by the Secretary of the Army Application January 31, 1951, Serial No. 208,782

6 Claims. (Cl. 235—61)

(Granted under Title 35, U. S. Code (1952), sec. 266)

The invention described herein may be manufactured and used by or for the Government for governmental purposes, without the payment to us of any royalty thereon.

This invention relates to apparatus for converting the data observed from the flight of a free balloon or similar data to a form more desirable for recording or for other practical purposes.

In the form of the invention herein presented data obtained from following the flight of a free balloon is fed to the apparatus which automatically converts the data to terms of wind velocity and direction. The desired data appears on the dials of direct reading instruments or the data may be recorded automatically upon a graph sheet.

Briefly the apparatus consists of a mechanical triangulating device into which data, received from observing the path of a free balloon, is fed. The response of the apparatus to information fed thereto causes the triangle to assume proportions which are a measure of the value of the data desired based upon the data fed to the apparatus at a given moment in the cycle of observation.

The triangulating means includes a commutated wheel which rolls upon a plane, electrically conductive, surface while the triangle is changing its proportions in response to input signal information. The wheel is mounted in a bifurcated support which in turn is mounted to swing about a vertical axis offset from the wheel axis. Thus the wheel functions as a castor.

Information delineating the azimuth of the balloon is caused to move the said plane surface. Thus motion from the triangulating mechanism is combined in its effect on the wheel with that of movement of the plane table. The nature of the information fed to the apparatus and the physical proportions of the elements involved are such that their combined effect causes the plane of the castor wheel to actuate an instrument which indicates wind direction. The speed of rotation of the wheel initiates a series of pulses in an electric circuit passing through the plane table and the segments in the commutated wheel. The pulses thus created are fed to a properly calibrated integrating meter which indicates wind an accurate and efficient mechanism for deriving a desired group of output data values from a less useful group of input values wherein a highly simplified organization of elements produces accurate results not degraded by friction inherent in the apparatus.

A still further object of the invention is to provide a mechanism of the type indicated wherein the moving elements are modified by independent sources of power which in turn are controlled by input signals which may originate at a remote point.

A still further object of the invention is to provide a device such as that indicated wherein its operation is based upon the use of graphically applied trigonometric functions.

Other objects and features of the invention will more fully appear from the following description and will be more fully pointed out in the claims. To provide a complete understanding of the invention a particular embodiment thereof will be described and illustrated in the accompanying drawings wherein:

Figure 1:
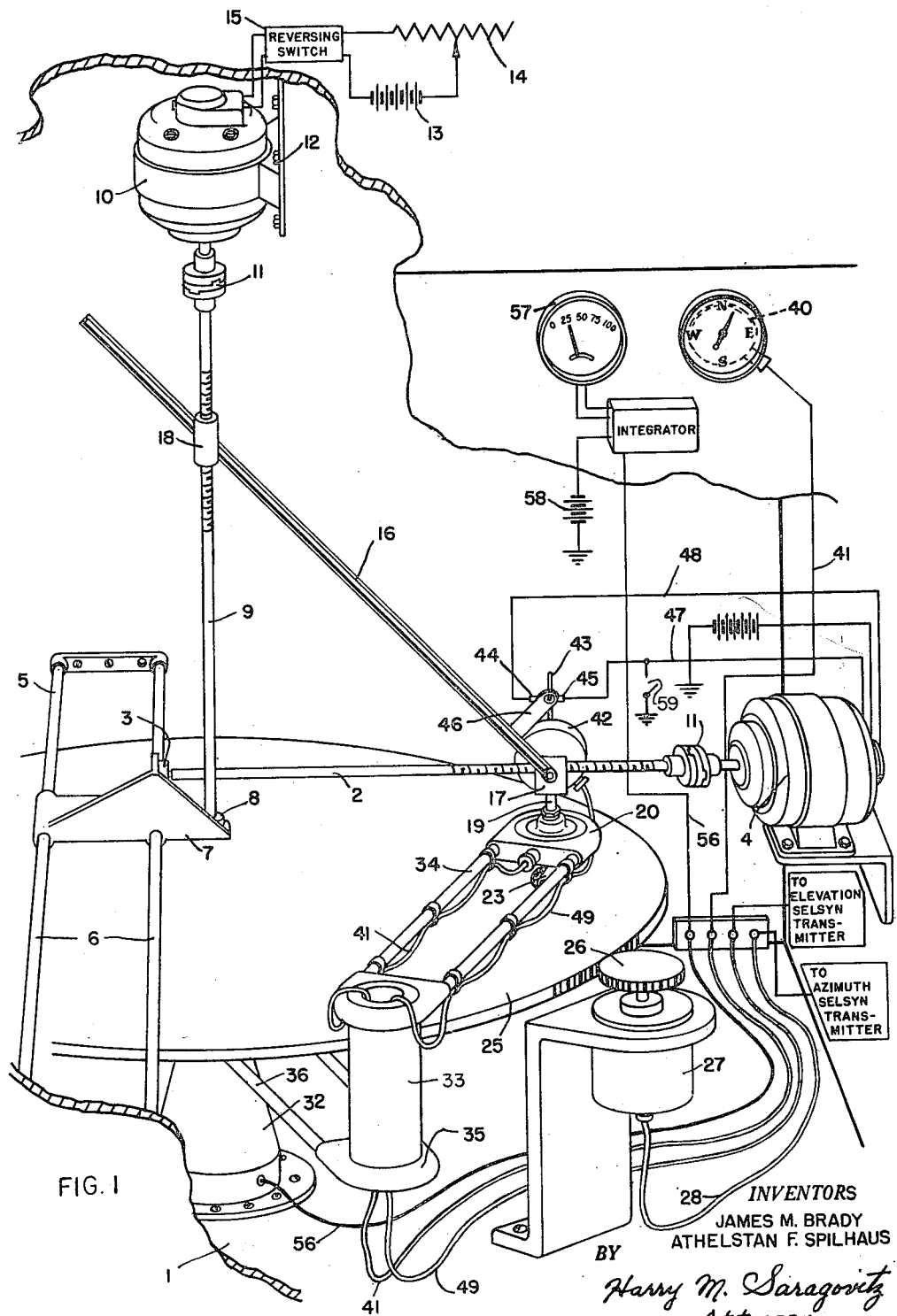
Fig. 1 is a general view of the apparatus in perspective.
Figure 2:
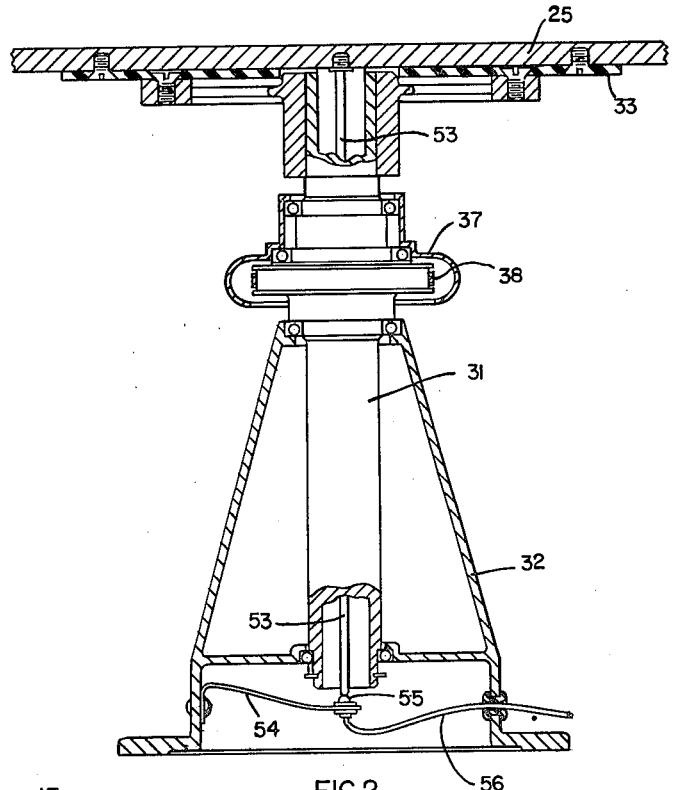
Fig. 2 is a partial vertical sectional view through a pedestal which rotatably supports the azimuth table of the mechanism.
Figure 3:
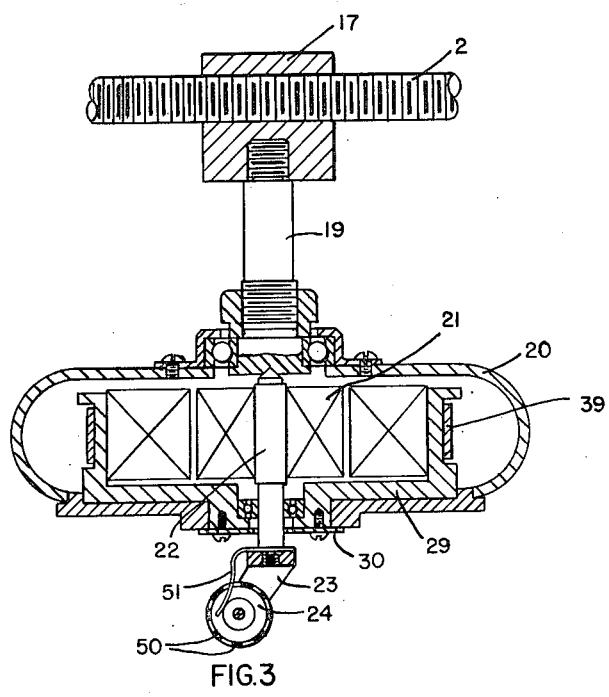
Fig. 3 is a cross sectional view of a portion of the apparatus taken in the plane of shafts 2 and 19 of Fig. 1.
Figure 1:
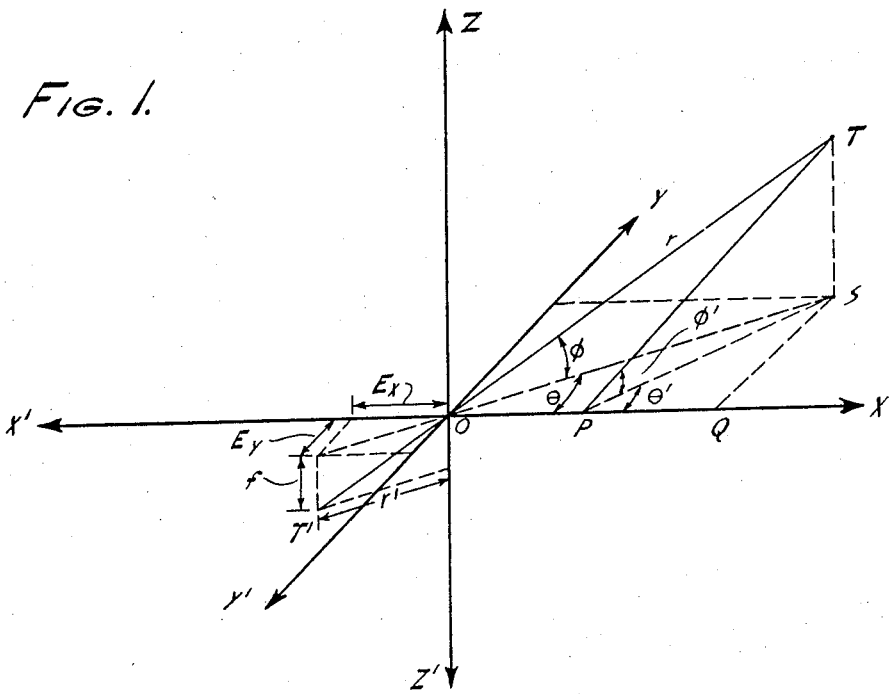
Figure 2:
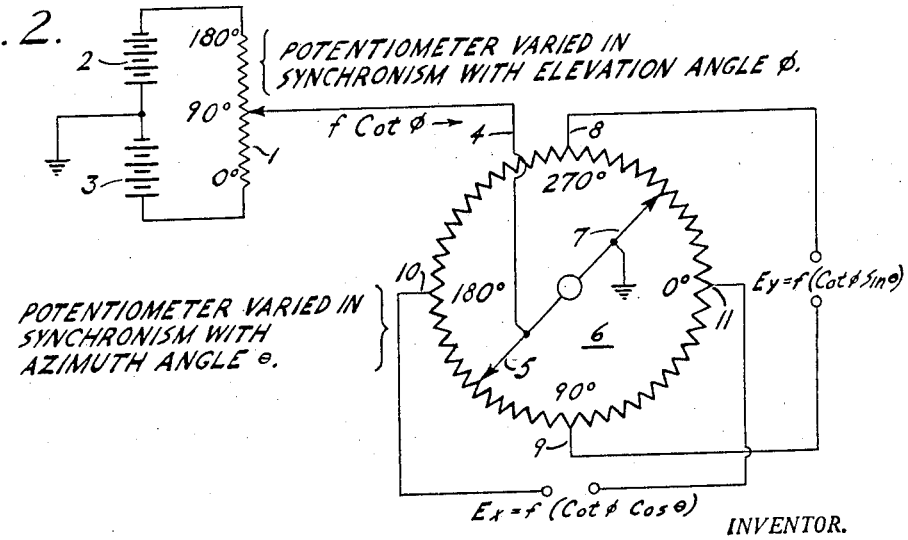

The embodiment of the invention herein described is particularly adapted to determine wind velocity and wind direction from information obtained by observing the flight of a free balloon. The invention, however, is adaptable to many similar uses wherein it is desired to automatically convert an input group of data values to other values having a form more useful for recording or for some other specific purpose.

The invention is used very effectively in connection with a radio direction finder which when set in operation delivers information to the apparatus of the invention as to the azimuth and elevation angle of the balloon at all times throughout the observing cycle. However, the invention may also be used in connection with ing member being suitably grounded to the castor.

As the wheel rolls, it creates a series of pulses of current passing through the plate 25, thence through a conducting rod 53 secured to the plate and passing through the hollow shaft 31. A spring member 54 holds an insulated contact point 55 against the lower end of the rod 53, while a wire 56 is in turn connected to an integrating meter 57 calibrated to indicate wind velocity. The circuit to the meter is energized by a battery 58 or other suitable means. The speed of rotation of the wheel 24 is thus translated into a series of timed pulses which in turn are transmitted to the wind velocity indicator 57.

As the azimuth information is delivered to the plate 25 the castor swings into wind direction indicating position as above set forth. Since at the same time the carrier 17 may be moving, its motion is combined with the rotation of the plate which causes the castor to assume a position representing the angle of a vector derived from the two movements above set forth. Also the speed of rotation of the wheel 24 indicates the magnitude of the vector. Thus a true indication of wind velocity is obtained on the meter 57 throughout the observing cycle.

To prepare the apparatus for the start of an observation cycle the motors 4 and 10 are operated to restore the triangulation mechanism to zero setting. The motor 4 is reversed by means of the switch 15 which restores the rod 16 to its horizontal position. A manual switch 59 is closed to move the carrier 17 to the left until the axis of the carrier selsyn is aligned with the axis of rotation of the plate 25. The motor circuits are then opened and the apparatus is ready for operation.

At the moment the balloon is released or at the start of the observing period for observing a target of any type the motors 4 and 10 are started and the radio direction finder is allowed to take over automatic operation. Throughout the cycle of operation wind velocity and direction are indicated on the meters.

The shafts 2 and 9 are offset from each other the required distance to permit the carrier 17 to reach its zero or starting point. It will be noted also that due to the manner of connecting the shaft 31 to the carrier selsyn stator the motion of the carrier along the shaft 2 will introduce no error in azimuth information received from the radio direction finder.

What is claimed is:

1. A velocity and direction computer comprising a triangulating mechanism having the form of a right triangle, said triangle having means associated therewith for translating information obtained from following the path of a target, said means acting to adjust the size of the triangle elements to represent changing values of altitude and elevation angle, such adjustment acting automatically to solve the triangle for horizontal range which is indicated upon the second side thereof, carrier means responding to the rate of change of horizontal range along the said second side of the triangle, a castor on said carrier, a flat surface azimuth member, means to move said member tangentially to the travel of said carrier and in response to changes in azimuth of the position of the target, said castor having its wheel rolling upon said azimuth member, a selsyn motor having its rotor and stator rotatable about the axis of said castor pivot, means acting to rotate one element of the selsyn in response to azimuth information received from the target and the other element thereof being connected to and rotating with the swinging movement of the castor, a receiver selsyn connected to the transmitting selsyn whereby the azimuth of the castor position is indicated, such position being derived from the observed azimuth information as modified by the rate of change of horizontal range.

2. A velocity and direction computing apparatus comprising a horizontal range determining mechanical right triangle including means for registering the altitude of a target along one side of said triangle, and means for registering the elevation angle of the target between one side and the hypotenuse of the triangle, both of said means acting together to constantly solve the triangle thereby to obtain horizontal range, a carrier moving along the other side of the triangle under the influence of the change in the aforesaid elements of the triangle thus to record the horizontal range of the target, means for responding to velocity and direction of travel of the target including an observed azimuth member rotatable in response to azimuth information received from the target, a selsyn mounted upon and bodily movable with said carrier, means for rotating one member such as the stator of the selsyn synchronously with said azimuth member, a castor having the rotor or other member of the selsyn secured upon the axis upon which the castor swings and having its wheel engaging said azimuth member, a driven selsyn actuated from said driving selsyn acting to indicate the true azimuth of the direction of travel of the target, and time means actuated by rotation of said castor wheel to indicate velocity of the target.

3. A velocity and direction computing device comprising a horizontal range determining mechanical triangle including means for registering the altitude of a target along one side of the triangle, which coincides with a reference axis, and means for registering the elevation angle between a side and the hypotenuse of the triangle, both of said means acting together when fed respectively with observed altitude and elevation angle, to solve the triangle for the horizontal range of the target, the indicator for said horizontal range constituting a carrier moved by the said means for registering the altitude and elevation angle of a target and radially from said reference axis, means for responding to velocity and direction of travel of the target including a flat table rotatable about said reference axis in response to changes in observed azimuth of the target, a caster on said carriage having its wheel engaging said flat table and swingable on an axis perpendicular thereto, a selsyn having its axis coinciding with said vertical axis and having one of its members rotatable with the swinging of said caster and its other member having supporting means operable to rotate it in synchronism with the rotation of said plate independently of bodily movement of said carrier and means for indicating velocity and azimuth of the target as resolved by the position and speed of rotation of said caster wheel.

4. A velocity and direction computing device having the elements defined in claim 3 together with means for supporting the outer member of said selsyn to move universally in a plane parallel to the said flat plate and means associated with said universal supporting means for rotating the outer member of the selsyn in synchronism with the rotation of said plate independently of the bodily movement of said carrier.

5. A velocity and direction computing device having the elements defined in claim 3 together with an articulated supporting arm pivoted at one end upon said reference axis and supporting the outer member of said selsyn at its other end, said articulated supporting arm having constant center distances between its pivotal points and means associated with said arm and pivoting upon the axes of said arm and acting to rotate the outer member of said selsyn in synchronism with the rotation of said plate.

6. A velocity and direction computing device having the elements defined in claim 3 together with an articulated supporting arm pivoted at one end upon said reference axis and having at its other end a rotatable member supporting the outer member of said selsyn, driving means for rotating said outer member in synchronism with the rotation of said plate independently of bodily movement of said carrier and metering means on said caster wheel making intermittent electrical contact with said flat plate whereby a source of power connected between said caster wheel and said plate will be pulsed at a speed proportional to the speed of said wheel and means for recording said pulses in terms of velocity of the target.

JAMES M. BRADY.
ATHELSTAN F. SPILHAUS.

References Cited in the file of this patent

UNITED STATES PATENTS

| Number | Name | Date |
| --- | --- | --- |
| 2,476,625 | Ricordel | July 19, 1949 |
| 2,519,180 | Ergen | Aug. 15, 1950 |

FOREIGN PATENTS

| Number | Country | Date |
| --- | --- | --- |
| 167,191 | Great Britain | Sept. 8, 1921 |
| 414,995 | Great Britain | Aug. 16, 1934 |

Sept. 13, 1955 D. E. SUNSTEIN 2,718,000
RADIO LOCATING SYSTEM FOR PRODUCING
STEREOSCOPIC INDICATIONS OF OBJECTS
Filed Nov. 6, 1946 7 Sheets-Sheet 1

INVENTOR.
DAVID E. SUNSTEIN
BY
Brown, Denk & Synnestvedt
AGENTS